March 25, 1969 H. D. EPSTEIN 3,435,401
INSULATED ELECTRICAL CONDUCTORS
Filed Oct. 5, 1966

Henry D. Epstein,
Inventor.
Koenig, Senniger, Powers and Leavitt,
Attorneys.

March 25, 1969 H. D. EPSTEIN 3,435,401

INSULATED ELECTRICAL CONDUCTORS

Filed Oct. 5, 1966 Sheet 2 of 3

United States Patent Office
3,435,401
Patented Mar. 25, 1969

3,435,401
INSULATED ELECTRICAL CONDUCTORS
Henry David Epstein, Cambridge, Mass., assignor to Texas Instruments Incorporated, Dallas, Tex., a corporation of Delaware
Filed Oct. 5, 1966, Ser. No. 584,386
Int. Cl. H01c *3/04, 7/02*
U.S. Cl. 338—214        1 Claim

ABSTRACT OF THE DISCLOSURE

An insulated self-protective electrical conductor is made by bringing into interfacial engagement a conductive polymer and an insulating polymer, each of which is cross-linkable. Conductivity in the conductive polymer is effected by the inclusion therein of conductive particles such as carbon black or a metal so as to provide a non-linear positive temperature coefficient of resistance. The conductive polymer is the sole current-carrying member between terminal points of the conductor. Engagement between the conductive and insulating polymers is performed by extrusion to form elongate conductors, or in a press to form planar devices such as heating tiles, circuit boards and the like. In either case, upon or shortly after said engagement, cross-linking of the polymers is induced by a suitable catalyst, irradiation or the like. The cross-linking occurs in each polymer to improve it and also occurs across the interfacial contact between the polymers to produce a tough strongly bonded insulated conductor which protects itself and electrical apparatus which it serves from excessive currents and any destructive temperatures which might otherwise result.

---

Among the several objects of the invention may be noted the provision of strong, lightweight insulated electrical conductors employing low-cost polymeric materials and requiring the use of little if any of the usual more costly solid-metal conductive metals such as copper, aluminum, silver or the like which are sometimes difficult to obtain; the provision of insulated conductors of the class described which have positive temperature coefficients of resistance (PTC) of a nonlinear character, thereby making the conductors protective against overheating of their insulation; and the provision of protective conductors of the class described which have a variety of applications as, for example, controlled heating means, overload protective leads to electrical appliances such as motors which may be served by the conductor, circuit boards or the like. Other objects and features will be in part apparent and in part pointed out hereinafter.

The invention accordingly comprises the products and methods hereinafter described, the scope of the invention being indicated in the following claim.

In the accompanying drawings, in which several of various possible embodiments of the invention are illustrated, FIGS. 1–4 illustrate short sections of various forms of insulated conductors embodying the invention;

FIG. 5 is an isometric view illustrating another form of the invention for use as heating elements in the form of area-filling tiles or the like for floors, walls and ceilings or the like;

Corresponding reference characters indicate corresponding parts throughout the several views of the drawings. The drawings are not to scale, being diagrammatic.

Figure 1:
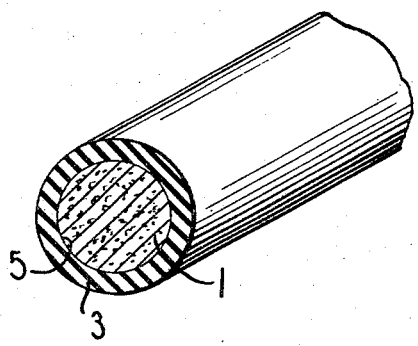

Insulated conductors as heretofore made have been generally constructed of a conductive core of one or more metals such as solid copper, aluminum, silver or the like with one or more surrounding substantially nonmetallic insulating sheaths. Others, such as circuit boards, have consisted of insulating sheets carrying metallic conductors. These as above indicated have the disadvantages of considerable weight and cost of the solid metals, which are sometimes in short supply. Moreover, the conductors and their insulating members are of such different materials that bonding between them is not always completely satisfactory. In addition, the insulation in some cases is prone to damage from overheating by the core when electrically overloaded. Lastly, the conductive materials exhibit only a small substantially linear PTC effect whereas it is often desirable that a substantially nonlinear PTC effect shall be had, i.e., one having at some transitional temperature a sharp increase in resistance so as to sharply limit increase in current.

By means of the present invention, improved self-protective electrical wires, cables, heating elements, circuit boards and like products may be constructed which are light in weight, strong, and composed of always available, low-cost plastic materials.

Briefly, the invention comprises constructing each of a conductive material and its insulation of a cross-linkable polymeric material. Thus the polymer of one member is to be conducting such as by the introduction of metal ions therein, the dispersion therein of a number of conductive particles or by equivalent means known in the art. This member and the insulation are brought together mechanically into an assembly in close physical contact in the desired assembled physical form. Upon or after assembly, there is performed by any of the known processes a cross-linking of the materials of the polymers. This may be either with or without the use of known catalysts, according to the cross-linking process used. As a result, in addition to any cross-linking in each polymer a very strong bond is obtained at the interfacial contact area between them.

There are various families of cross-linkable polymers useful in carrying out the invention. One family is the polyolefins which include polyethylene, polymethylene and polypropylene. Another is the family of halogenated polyolefins. Other families are the polyacrylics and the polyesters. These in their virgin state are nonconductive. But they may be infilled with particulate conductive particles such as carbon-black or finely divided metal to become conducting. A conducting polymer core can also be composed of polycations derived by N-alkylation of poly (4-vinylpyridine), isotactic poly 2-vinylpyridine), poly (ethyleneimine), poly (N-vinylimidazone) and poly (p-N, N-dimethylaminostyrene) as well as a poly (p-xylylene oxide) bearing side-chain trimethylammonium substituents. These materials exhibit useful PTC characteristics. This list is not to be taken as limiting.

Figure 10:
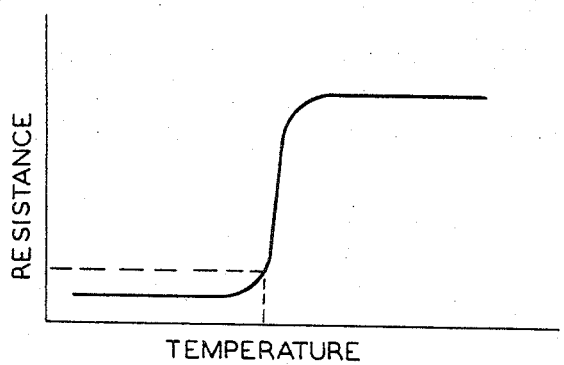
FIG. 10 is a graph illustrating certain so-called nonlinear PTA effects.

It is known to those skilled in the art that polymers by suitable processes may be cross-linked to improve their mechanical properties such as toughness, flexibility, heat-resistance and the like. Cross-linking in the case of PTC materials also brings about increased stability in the nonlinear PTC mode of resistance change in response to increased current flow, such as illustrated in FIG. 10.

The invention is concerned with the combination in contact of at least two polymers, one of which functions in the form of an insulator and the other as a conductor, these polymers being strongly bonded together by performing a cross-linking operation after they have been brought into contact, thereby not only improving each per se but also effecting a very strong bond between them.

There are various well-known methods for effecting cross-linking of cross-linkable materials such as above mentioned, with and without the use of catalysts. Some employ catalysts with application of appropriate temperatures and pressures, or by the use of various forms of ionizing radiation. Examples of methods for inducing cross-linking are disclosed in U.S. Patents 3,105,024, 3,013,068, 2,902,421, 3,006,829, 2,978,396, 3,158,560, 3,231,483 and others.

Referring to FIG. 1 it illustrates a conductive wire, cable or the like made according to the invention, consisting of a cross-linkable polymeric conductive core 1 which has been coextruded in contact with an insulating cross-linkable polymeric sheath 3. The material of core 1 is of the conductive variety mentioned in the group listed above and indicated by dots in the drawings. The materials of the core 1 and sheath 3 may be assembled by coextrusion with suitable catalysts as required and subjected to heat and pressure so as to produce cross-linking at the interface as extrusion proceeds. Or the assembly by extrusion may be performed without catalysts under non-cross-linking conditions and cross-linkage effected by subsequent ionizing radiation or the like with or without the use of catalysts. Sometimes a subsequent heat treatment is employed.

The result of the performance of the cross-linking step while the materials to be bonded are in contact is important. If complete cross-linking operations were to be performed individually on the conductive core 1 and the insulating sheath 3 before assembly, there would not result the desired cross-linking at the interface 5 to improve the interfacial bond. It will be appreciated that by coextruding melted materials somewhat of a bond is obtained; but it is not as good as one obtained by cross-linking at the bond interface. The cross-linking in effect changes a polymer material from a thermoplastic to a thermosetting variety. Thus the bond at the interface is thermoset rather than merely by mere solidification of more or less adhesive materials.

Products made according to the invention have many uses. Thus in the case of the conductor illustrated in FIG. 1 the conductive core material 1 exhibits a stabilized nonlinear PTC resistance effect such as illustrated in FIG. 10. The resistance of the insulated conductor may be such as to limit the amount of current and resulting temperature rise to prevent overheating of the insulation (see the dotted lines in FIG. 10). Thus in effect the insulated conductor assembly shown in FIG. 1 is self-protective against overheating. It will be noted that if the conductivity of the core 1 is low, compared to copper this will considerably limit maximum current, with the result that the length of the conductor will be limited if excessive voltage drop along its length is to be avoided. However, for example, a six-foot length of such a conductor made according to the invention supplying a 600-watt electrical appliance can protect the appliance (a fractional horsepower motor, for example) against the damaging effect of overload current caused by internal breakdown, a locked rotor or the like. For conductors having less resistance, longer lengths may be usefully employed.

By means of the improved bond the combination of the conductor and insulator is very strong and may be flexed without engendering excessive stresses. Thus outer flexing strains in the conductor, through the improved bond, are more efficiently transmitted to the outer insulation. This reduces the stresses in each. Differential expansion is also minimized. The improved bond also makes more efficient the heat-conducting path between the conductor and insulator for better cooling of the former under substantial electrical loads.

The specific gravity of an insulated conductor such as shown in FIG. 1 can be made much lower than that of a conventional solid-metal-core conductor. In low-current signalling or communication systems such as cable, such lower specific gravity has great advantage, for example, in aircraft, military and like applications. The specific gravity can be made less than that of water by the selection of appropriate polymers and an appropriate amount of the particulate conductive material. Such a conductor may be made to float.

Figure 2:
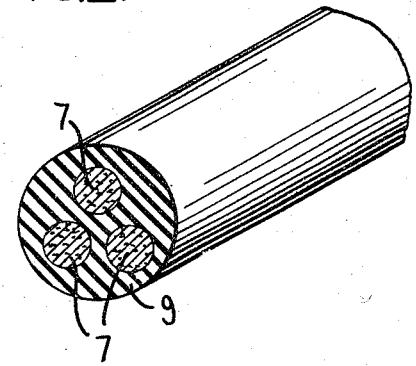

It will be understood that if desired several polymerized conductive cores may be placed in one polymerizing insulated mass such as shown, for example, in FIG. 2 wherein numeral 7 indicates three conductors within a single insulating sheath 9, the entire assembly having had a cross-linking operation performed after contact of its components 7 and 9.

Figure 3:
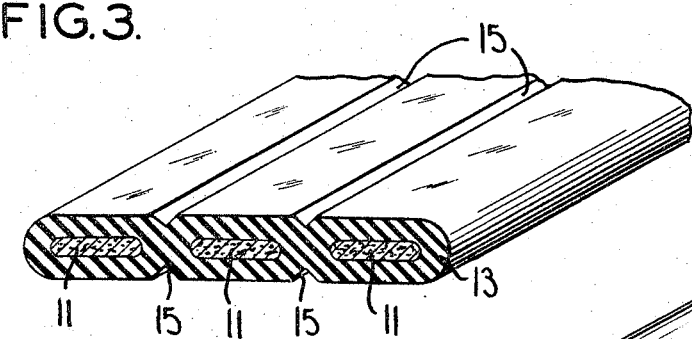

In FIG. 3 is shown another form of the invention in which three ribbon-like nonlinear PTC conductors 11 have been coextruded with an insulating ribbon 13 and provided with score lines or grooves 15 for subsequent complete or partial tearing or slitting to form various types of insulated conductors, the product being completely cross-linked substantially only during or after extrusion, and in the latter case either before or after slitting. Electrical harnesses may be made of such material.

Figure 4:
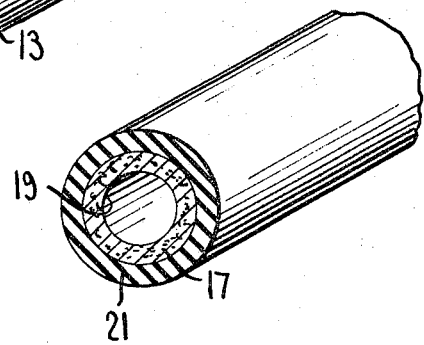
Figure 11:
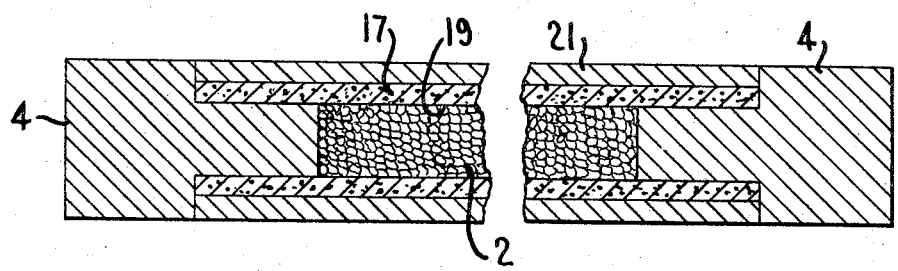
FIG. 11 is an axial section of another form of the invention.

As illustrated in FIG. 4, the conductive polymer core lettered 17 is made hollow as indicated at 19, the same being covered by an insulating polymer sheath 21. This form of the invention has use in the electrical heating of any gases or liquids that may be passed through the hollow portion 19. It is also useful for a device such as shown in FIG. 11, in which the hollow portion 11 of bonded members 17 and 21 is filled with conductive salts, fluids, powders or the like 2 and sealed in by conductive terminals 4. In this case the conductive polymer sheath 17 provides a shunting path between terminals 4 around the filler 2 which may contain high-resistance voids.

Figure 5:
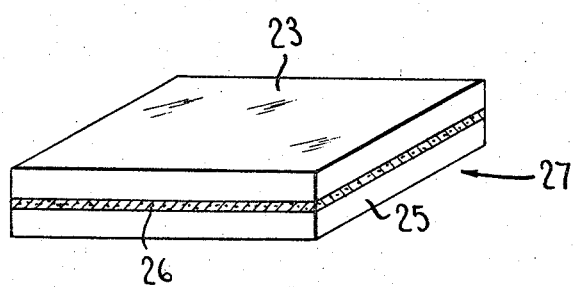
Figure 6:
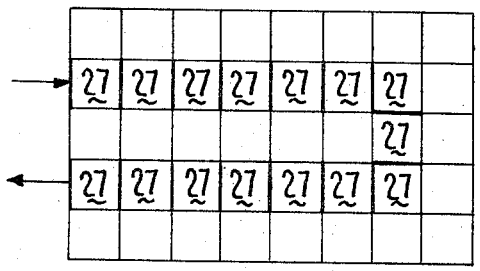
FIG. 6 is a plan view illustrating a typical arrangement of elements such as shown in FIG. 5.

It is to be understood that the process of coextrusion is not the only one for mechanically assembling a conductor with its insulation prior to the cross-linking operation of the constituent polymers. Thus layers of polymers may be pressed into engagement on opposite sides of a polymerized conductive material having desired resistance for heating, thus forming a sandwich which can be used as a polygonal floor, wall or ceiling heating tile 27 as illustrated in FIGS. 5 and 6. As shown in FIG. 5, cross-linkable polymer layers 23 and 25 have been mechanically squeezed under heat and pressure on opposite sides of an intermediate layer of polymer 26, filled as above described. A cross-linking step has been performed during or after the mechanical assembly to form a tile 27. FIG. 5 is a plan view of a floor section made up partly of conductive tiles 27 so arranged that contact between conductive sections of adacent tiles provides a self-protective heating circuit. If necessary electrical contact between adjacent members of the range of tiles 27 may be secured, for example, by the use of an epoxy resin infilled with conductive particles such as silver. The darker lines 29 on FIG. 6 illustrate the location of such connective material. External circuitry is represented by the arrows. Unnumbered tiles in FIG. 6 may be conventionally constructed.

Figure 7:
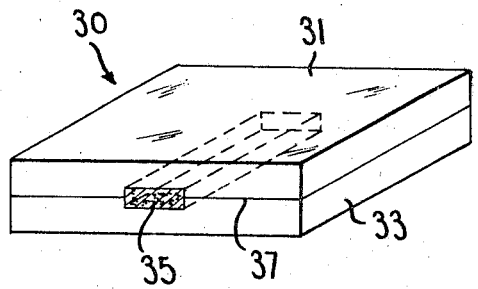
FIGS. 7 and 8 are views similar to FIG. 5 illustrating two other forms of heating elements embodying the invention.
Figure 8:
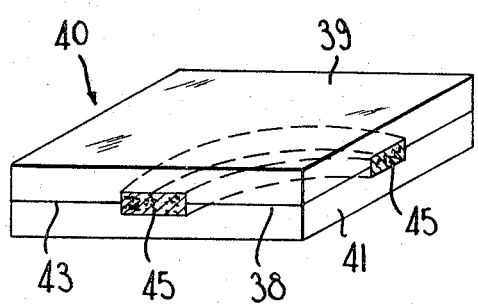

At 30 and 40 in FIGS. 7 and 8 are shown polygonal tile forms in which the conductive core parts are made less in area than the whole tile areas. Thus in FIG. 7 polymer layers 31 and 33 sandwich an infilled polymer conductor core 35, the bonded interfacial area being shown at 37. The core 35 terminates on opposite sides of the tile 30. In FIG. 8 the polymer layers of tile 40 are numbered 39 and 41. The sandwiched conductor core 45 is curved and terminates on adjacent sides of the tile 40. The bonded interface is numbered 38.

The principles above set forth are used in constructing tiles 30 and 40, which is to say that the assemblies of elements (31, 33, 35) or (39, 41, 45) as the case may be are each mechanically brought together and simultaneously or subsequently cross-linked, as distinguished from having been previously cross-linked.

Figure 9:
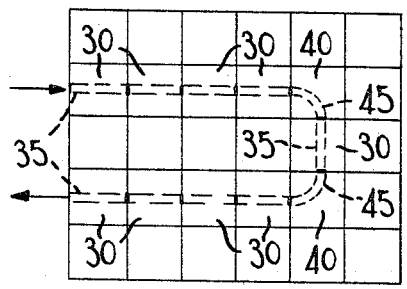
FIG. 9 is a plan view similar to FIG. 6 illustrating an arrangement of elements such as shown in FIGS. 7 and 8.

In FIG. 9 tiles 30 and 40 are shown in a tile floor in a range adapted to form a circuit therein. The remaining tiles may be conventional. Silver-filled epoxy resin connections are represented by the short heavy black lines. Again, the arrows represent outside circuitry.

It will be understood that the area-filling square form of tiles illustrated is not limiting, inasmuch as other area-filling polygonal forms may be used such as hexagons, for example.

Figure 12:
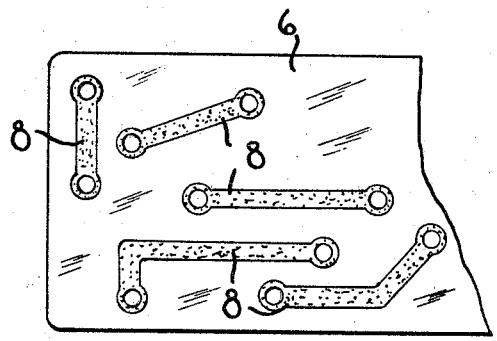
FIG. 12 is a fragmentary plan view of a typical circuit board made according to the invention.

In FIG. 12 is shown another form of the invention. This comprises a sheet 6 composed of a cross-linkable insulating plastic such as above described. Bonded to this are circuit elements 8, each of which is composed of a cross-linkable conductive plastic such as above-described. In constructing the board the circuit elements 8 are brought into engagement with the insulating sheet 6 under suitable pressure, as required, cross-linking being brought about while they are in contact. This produces a circuit board having the class of greatly improved bonds between the circuit elements and the conductive sheet which supports them, as above described in connection with the other forms of the invention.

As to all forms of the invention, and particularly the coextruded forms, it is to be understood that after the cross-linkable polymeric masses of material have been contacted and the cross-linking operation performed thereon while in contact, subsequent heating of the combined cross-linked materials may be performed which will further improve the bond.

In view of the above, it will be seen that the several objects of the invention are achieved and other advantageous results attained.

As various changes could be made in the above products and methods without departing from the scope of the invention, it is intended that all matter contained in the above description or shown in the accompanying drawings shall be interpreted as illustrative and not in a limiting sense.

What is claimed is:

1. An insulated conductive assembly comprising a cross-linked conductive polymeric core material infilled with particulate conductive particles and having a non-linear positive temperature coefficient of resistance, a cross-linked polymeric insulating material forming a sheath around the core material, said core material constituting the sole current carrying means of the assembly, and a cross-linked bond across the interface between the core and the sheath.

References Cited

UNITED STATES PATENTS

| | | |
|---|---|---|
| 2,563,952 | 8/1951 | Nichol. |
| 2,575,987 | 11/1951 | York. |
| 2,597,741 | 5/1952 | Macey. |
| 2,628,998 | 2/1953 | Frisbie. |
| 2,697,157 | 12/1954 | Kersta _____ 174—69 X |
| 3,082,292 | 3/1963 | Gore. |
| 3,096,210 | 7/1963 | Boonstra _____ 117—216 |
| 3,167,255 | 1/1965 | Point _____ 174—126 |
| 3,187,071 | 6/1965 | Radziejowski. |
| 3,229,030 | 1/1966 | Baermann. |
| 2,331,116 | 10/1943 | Goldschmidt _____ 174—110 |
| 3,329,764 | 7/1967 | Tanges _____ 174—74 |
| 2,861,163 | 11/1958 | Asakawa _____ 338—214 |

FOREIGN PATENTS

| | | |
|---|---|---|
| 10,440 | 1914 | Great Britain. |

LEWIS H. MYERS, *Primary Examiner.*

ELLIOT GOLDBERG, *Assistant Examiner.*

U.S. Cl. X.R.

174—110, 126; 338—13